United States Patent [19]

Macq

[11] Patent Number: 5,963,885
[45] Date of Patent: Oct. 5, 1999

[54] SENSING CIRCUIT

[75] Inventor: Damien Luc Francois Macq, Louvain-la-Neuve, Belgium

[73] Assignee: Alcatel N.V., Rijswijk, Netherlands

[21] Appl. No.: 08/718,641

[22] Filed: Sep. 17, 1996

[30] Foreign Application Priority Data

Sep. 18, 1995 [EP] European Pat. Off. .............. 95202532

[51] Int. Cl.$^6$ ....................................................... H04B 3/46
[52] U.S. Cl. ............................................... 702/57; 327/13
[58] Field of Search ............................... 702/57, 66, 189; 324/76.12, 76.16; 327/1, 13, 37

[56] References Cited

U.S. PATENT DOCUMENTS 4,534,043   8/1985   Krishnan ................................... 375/104

OTHER PUBLICATIONS

Macq et al., "A CMOS Activity Detector for ADSL link" ESSCIRC '95 21st European Solid State Circuits Conference pp. 430–433, Sep. 19, 1995.
Chang et al., "A CMOS Analog Front End Circuit for an FDM based ASDL System" ISSCC95 IEEE Intl. Solid State Circuits Conf. pp. 330–331, 389, Feb. 17, 1995.
Chang et al., "A CMOS Analog Front End Circuit for an FDM based ASDL System" IEEE Journal of Solid State Circuits v. 30, n. 12 pp. 1449–1456, Dec. 1995.
Patent Abstracts of Japan JP4213269 (Apr. 8, 1992) and Japanese Patent Application JP900407342 (Jul. 12, 1990) Fujitsu Ltd.

Draft Amer. National Standard for Telecommunications—Interface Between Networks and Customer Installation—Asymmetric Digital Subscriber Line (ADLS) Metallic Interface Specification T1E1. 4/94–007R6.

*Primary Examiner*—Melanie A. Kemper
*Attorney, Agent, or Firm*—Ware, Fressola, Van Der Sluys & Adolphson LLP

[57] ABSTRACT

The sensing circuit is used in an Asymmetric Digital Subscriber Line (ADSL) transmission system to detect a wave signal with a predetermined shape in an input signal (IN1/IN2) transmitted over the system and applied to an input terminal (IN1/IN2) of the sensing circuit. It includes two branches with a correlated double sampling circuit (CDS1/CDS2), a counter circuit (C1/C2) and a comparator circuit (CMP1/CMP2) coupled in series. An input (IN1/IN2) of the correlated double sampling circuit of each branch is coupled to the input of the sensing circuit and an output of the comparator circuits is coupled to an output terminal (OUT) of the sensing circuit via an OR-ing circuit. The correlated double sampling circuits are adapted to provide a sampled signal and the counter circuits count the number of pulses of the sampled signals. The thus obtained count values are in the comparators are compared with a predetermined value corresponding with the count value which should be obtained when the input signal is a, possibly distorted, signal with the above mentioned predetermined shape. The sensing circuit is clocked by two clock signals, one for each branch, which are in quadrature.

6 Claims, 3 Drawing Sheets

SENSING CIRCUIT

TECHNICAL FIELD

The present invention relates to a sensing circuit for a mixed transmission system for high and low frequency signals such as an Asymetric Digital Subscriber Line transmission system to detect a wave signal having a predetermined shape in an input signal transmitted over said system and applied to an input terminal of said sensing circuit.

BACKGROUND OF THE INVENTION

Sensing circuits for detecting wave signals, and more specifically sine wave signals, are well known in the art. They are often used as activity detector in telephony central units to initiate the set up of a telephony system being in sleep mode upon receipt of a request from a user, where this request is represented by a sine wave signal. The latter sleep mode is a low power mode limitations the power consumption at the user side, but especially at the central unit side where a relatively large amount of lines have to be powered. This mode is especially suited for systems wherein broadband services are offered on twisted pair cables since these services consume a lot of power due to the high operation speeds.

However, the existing sensing circuits are not suited for mixed systems for low and high frequency signals, such as ADSL systems as described in the ANSI draft standard "Asymetric Digital Subscriber Line (ADSL) Metallic Interface Specification", due to the presence of offsets and low frequency signals e.g. Plain Old Telephony Service or POTS signals.

DISCLOSURE OF THE INVENTION

Therefore, the object of the invention is to provide a sensing circuit for detection of a wave signal with a predetermined shape which can be used in systems such as ADSL systems.

According to the invention this object is achieved by a sensing circuit for a mixed transmission system for high and low frequency signals, for detecting a wave signal with a predetermined shape in an input signal transmitted over said system and provided to said sensing circuit, said sensing circuit comprising: a cascade connection of a correlated double sampling circuit, a counter circuit and a comparator circuit, said correlated double sampling circuit responsive to said input signal, for providing a sampled signal, said counter circuit responsive to said sampled signal for providing a count value signal corresponding to a number of pulses of said sampled signal and said comparator responsive to said count value signal for comparison with a predetermined value signal for providing a result signal indicative of said detecting of said wave signal.

Indeed, the well known filtering capacity of the correlated double sampling technique is used in this sensing circuit to filter out the offsets and low frequency POTS signals and in addition, a wave signal such as a sine wave signal is detected by comparing the number of signal pulses resulting from the sampling of the input signal by the double sampling correlated circuit, with a predetermined count value indicative of the presence of a sine wave signal.

In further accord with the present invention, the sensing circuit additionally includes a second cascade connection of a second correlated double sampling circuit, a second counter circuit and a second comparator circuit, corresponding to said correlated double sampling circuit, to said counter circuit and to said comparator circuit, respectively, said second correlated double sampling circuit responsive to said input signal for providing a second sampled signal, said second counter circuit responsive to said second sampled signal, for providing a second count value signal, said second comparator circuit responsive to said second count signal, for comparison with said predetermined value signal, for providing a second result signal indicative of said detecting of said wave signal, said sensing circuit further comprising an OR-ing circuit, responsive to said result signal and to said second result signal, for providing an output signal, said sensing circuit further comprising a clocking circuitry for providing a first clocking signal to said correlated double sampling circuit, to said counter circuit and to said comparator, and for providing a second clocking signal to said second correlated double sampling circuit, to said second counter circuit and to said second comparator circuit, said first clocking signal and said second clocking signal being substantially in quadrature with respect to each other.

Clocking the circuits of the two cascade connections as described above with quadrature clock signals, solves the problem which occurs in a sensing circuit with a single such cascade connection when the input signal and the used clock signal are shifted in such a way that the correlated double sampling circuit cannot work correctly, i.e. when the first constant value and the value of the input signal at the start of the subsequent third time interval are almost equal, for instance when the start of the second and of the third interval correspond with points of the sine wave signal located symmetrically with respect to the top of the wave signal. Indeed, thanks to the quadrature relationship between the clock signals the sensitivity of one branch becomes maximal when that of the other branch becomes minimal, and OR-ing of the provided result signals thus always gives a correct result.

In still further accord with the present invention, the predetermined count value equals a maximum count value, which would be provided in case of a perfect sine wave signal, minus a predetermined deviation value.

By comparing the count value with the maximum count value minus a deviation value, possible distortion of the wave signal due to transmission or desynchronization between e.g. central office and remote unit clocks is taken into account.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
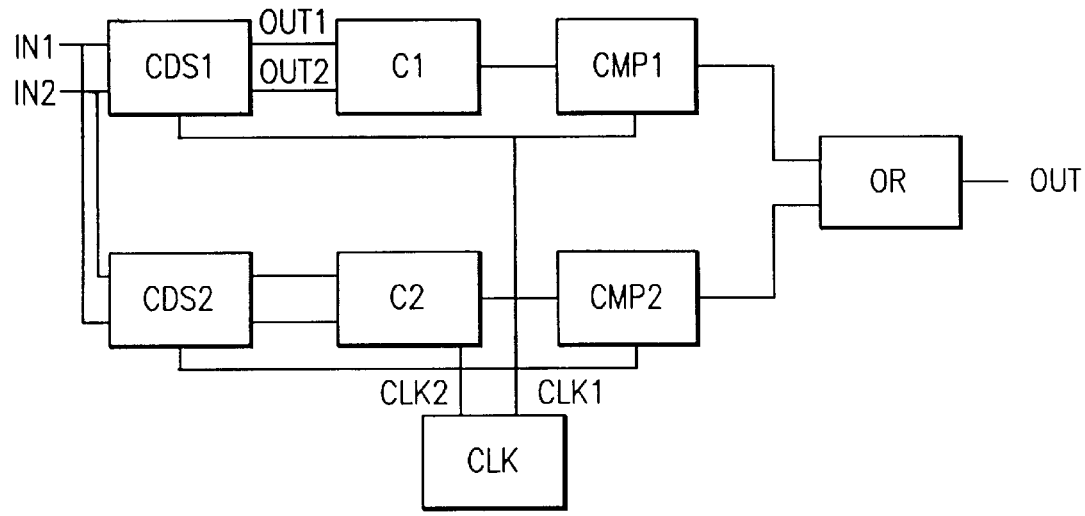
FIG. 1 is a schematic block diagram representation of a sensing circuit according to the invention.

The sensing circuit of FIG. 1 is used in an Asymetric Digital Subscriber Line or ADSL system (not shown), as activity detector to detect a request signal being a sine wave signal sent from an end user of the system to a central unit (192 kHz) or vice versa (48 kHz) to set up the system after a low power mode.

ADSL systems are well known in the art and are realized according to the ANSI draft standard "Asymmetric Digital Subscriber Line (ADSL) Metallic Interface Specification". ADSL signals are transmitted on twisted pair cables and contain telephone signals and data signals transmitted within a frequency band up to 3.4 kHz and of 25 kHz to 1.02 MHz respectively.

A sensing circuit of FIG. 1, according to the invention, is composed of a first and a second branch comprising a first double sampling circuit CDS1, a first counter circuit C1 and a first comparator circuit CMP1 connected in series, and a second correlated double sampling circuit CDS2, a second counter circuit C2 and a second comparator circuit CMP2 also connected in series, respectively.

An analog input signal IN1/IN2 is received over the twisted pair cable at like named input terminals of the sensing circuit which are connected to inputs of CDS1 and CDS2 and an output of CMP1 and of CMP2 are via an OR-ing circuit connected to an output terminal OUT of the sensing circuit. A clocking circuit provides CDS1, C1 and CMP1 with a first clocking signal CLK1 and provides CDS2, C2 and CMP2 with a second clocking signal CLK2, where CLK1 and CLK2 are quadrature signals.

Figure 2:
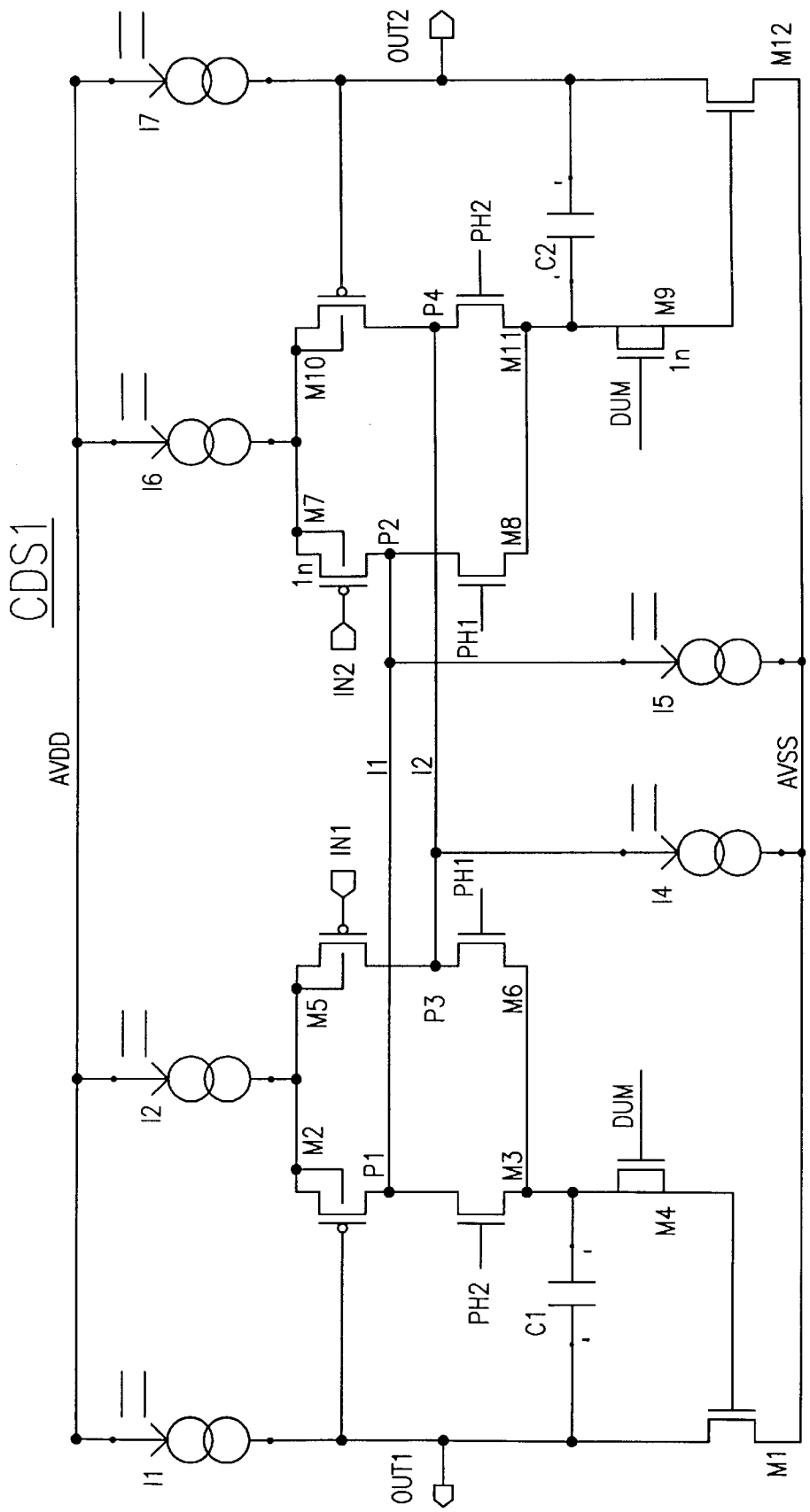
FIG. 2 shows CDS1 of FIG. 1 in more detail.

One of the correlated double sampling circuits namely CDS1 is described hereafter in details referring to FIG. 2, CDS2 being similar to CDS1.

CDS1 comprises a cross connected double differential pair of which a first pair includes the parallel connection of a first branch with a PMOS transistor M2 and a second branch with a PMOS transistor M5. M2 and M5 are connected in series with an NMOS transistor M3 and an NMOS transistor M6 respectively. The drains of M2 and M5 are via a current source 12 coupled to a first power terminal AVDD, while the sources of M3 and M6 are on the one hand via a capacitor C1 coupled to an output OUT1 and on the other hand, via the serial connection of the drain-to-source path of an NMOS transistor M4 and the gate-to-source path of an NMOS transistor M1 coupled to a second power terminal AVSS.The drain of M1 is also coupled to OUT1 and the gate of M2 is connected to OUT1 and is coupled via a current source 11 to AVDD, while the gate of M5 is connected to IN1. Two control signals PH1 and PH2 are applied to the gates of M6 and M3 respectively and another control signal DUM is applied to the gate of M4.

Figure 3:
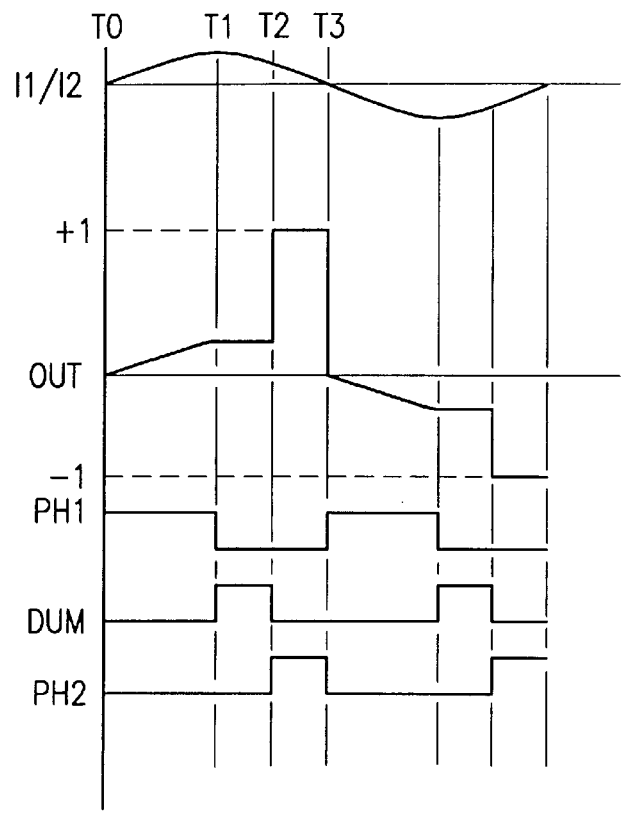
FIG. 3 represents a time diagram of signals generated in the circuits of FIG. 1 and FIG. 2.

The control signals PH1, PH2 and DUM are digital signals as shown in FIG. 3 and are derived from the clock signal CLK. Since it is obvious for a person skilled in the art how to derive signals such as PH1, PH2 and DUM from a clock signal, the circuitry for performing this derivation has not been shown and its working has not been described in detail.

The second differential pair is similar to the first one and includes transistors M7 and M10 which are coupled to current sources 16 and 17, transistors M8, M11, M9, and M12, a capacitance C2, the input IN2 and an output OUT2, in the same way as I2, I3, M3, M6, M4, M1, C1, IN1 and OUT1 respectively, all these elements performing similar functions as the respective elements coupled to the first differential pair.

The interconnection point of M2 and M3, P1, is via a connection L1 connected to the interconnection point of M7 and M8, P2, and is via a current source 15 connected to AVSS. In the same way, the interconnection point of M5 and M6, P3, is connected via a connection L2 with the interconnection point of M10 and M11, P4, and is via a current source 14 connected with AVSS.

I1 and I7, and I4 and I5 are in fact, load transistors of the PMOS and NMOS type, respectively, which are biased at the same voltage level.

The working of CDS1 and of the sensing circuit will be described hereafter with reference to FIG. 2, FIG. 3, FIGS. 4a, 4b and 4c, and FIG. 1 respectively. To simplify this description only one branch of the sensing circuit, i.e. the branch with M2 and M5, is considered which in fact corresponds to a single ended version of the sensor, the working of the other branch being identical and the complete CDS1 being a full differential version of the latter single ended version.

Figure 4A:
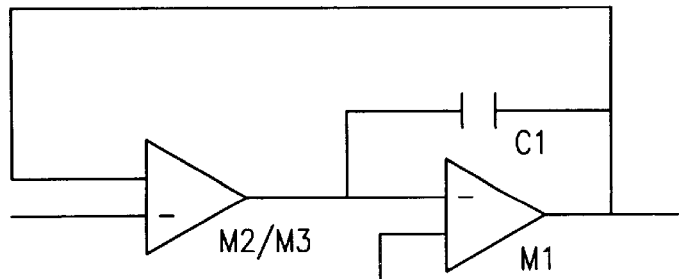
FIGS. 4a, 4b and 4c are schematic representations of part of CDS1 during the different phases of its operation.
Figure 4B:
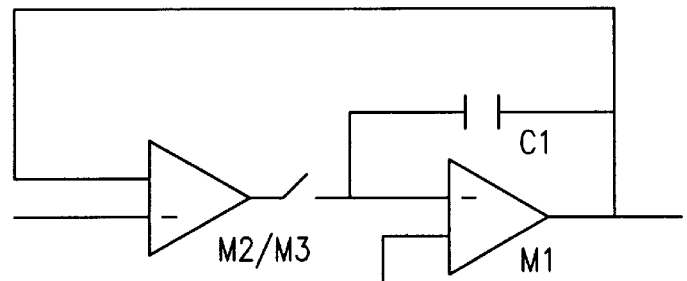
Figure 4C:
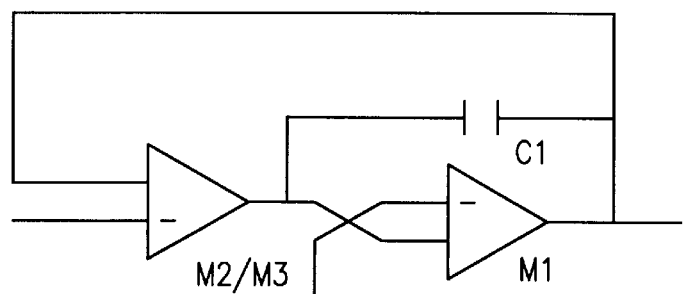

The MOS transistors M3 and M6, as well as M8 and M11 of CDS1 are used as switches to connect the circuit in a negative feedback loop (when the signal PH1 is high), or in a positive feedback loop (when the signal PH2 is high). During a first time interval T0-T1, PH1 is high and PH2 is low, which means that a negative feedback is realized in the first branch, thereby realizing a circuit as shown in FIG. 4a, i.e. the sensing circuit works as a tracking circuit and the output signal follows the input signal. When at T1 the transistors M6 is switched off, the capacitance C1 which is a Miller capacitance samples the input signal and the output signal remains constant until the transistor M3 is switched on at T2. Thus during the interval T1-T2, the sensing circuit corresponds to a hold circuit as shown in FIG. 4b. At T2 an internal positive feedback is realized, and the circuit works as a latch as shown in FIG. 4c, amplifying the difference between the value of the input signal at T1 and that at T2. At T3, when PH1 goes high and PH2 goes low, the circuit again becomes a voltage follower circuit.

As a result, a correlation is provided between the frequency of the clock signal CLK and the frequency of the input signal, and a periodic bipolar digital-like return-to-zero signal is produced such as the one shown in FIG. 3. When as in the latter figure the frequency of the input signal equals half that of the clock signal, the output signal has a frequency equal to half that of the clock signal.

In order to limit charge injections resulting from the switching of M3/M6 and M8/M11 the transistors M4 and M9 are provided and controlled by the signal DUM and big miller capacitances are provided. The value of these capacitances is however limited by the required speed of the circuit and by power consumption specifications. For a maximal clock frequency of 384 Khz for instance a capacitance of 4pF is used.

In the following it is explained how the generated digital like signal is used in the sensing circuit to detect a, sine wave signal.

A sine wave signal on the line with frequency equal to e.g. f0 can be seen as a set of altering positive and negative slopes at the frequency f0. If the sampling circuit samples the incoming signal at a frequency 2f0, then it will produce a set of +1−1+1−1 at its output. All other signals will produce a random set of 1 and 0 sequences.

Therefore, a sine wave signal can be detected in the present circuit by counting the number of 1 to −1 transitions of the signals generated by CDS1 and CDS2 in a predetermined time interval, e.g. 333 μs and comparing this number with a predetermined number corresponding to the number of transistions obtained when sampling a perfect sine wave. However, since the sine wave can be distorted during transmission over the line, it is determined in CMP1 and CMP2 whether the counted number lies within a range around the predetermined number.

It has to be noted, that in order to realize the sampling of the input signal, a static comparator with a capacitive coupling could be used. However, the cut-off frequency of such a circut cannot be controlled in an accurate way (up to 30% uncertainty) and its rejection of the POTS signal would be lower.

The above described principle is implemented in the two branches of the subject sensing circuit. The sampled signal provided by CDS1 and CDS2, is applied to the counters C1 and C2 respectively and is in CMP1 and CMP1 respectively compared with a predetermined value range.

The reason for having two branches in the sensing circuit is that since the phase of the input signal is not controlled with respect to that of the clock signal, it could happen that the phase shift between these signals is such that the sensor sensitivity becomes very small, and that as a result thereof, the circuit can no longer work correctly, e.g. when T1 and T2 correspond to instances at which the sine wave has the same values, i.e. at points located symmetrically with respect to the top of the sine wave. Therfore, the two branches are used and they are clocked by quadrature signals, so that when the sensitivity of e.g. CDS1 is minimal, that of CDS2 becomes maximal. The result signal of the comparison in CMP1 and CMP2 is then OR-ed and the output signal generated by the OR-ing circuit gives the final result.

While the principles of the invention have been described above in connection with specific apparatus, it is to be clearly understood that this description is made only by way of example and not as a limitation on the scope of the invention.

I claim:

1. Sensing circuit for a mixed transmission system for high and low frequency signals, for detecting a wave signal with a predetermined shape in an input signal transmitted over said system and provided to said sensing circuit, said sensing circuit comprising: a cascade connection of a correlated double sampling circuit, a counter circuit and a comparator circuit, said correlated double sampling circuit responsive to said input signal, for providing a sampled signal, said counter circuit responsive to said sampled signal for providing a count value signal corresponding to a number of pulses of said sampled signal and said comparator responsive to said count value signal for comparison with a predetermined value signal for providing a result signal indicative of said detecting of said wave signal.

2. Sensing circuit according to claim 1, wherein said sensing circuit additionally includes a second cascade connection of a second correlated double sampling circuit, a second counter circuit and a second comparator circuit, corresponding to said correlated double sampling circuit to said counter circuit and to said comparator circuit, respectively, said second correlated double sampling circuit responsive to said input signal for providing a second sampled signal, said second counter circuit responsive to said second sampled signal, for providing a second count value signal, said second comparator circuit responsive to said second count signal, for comparison with said predetermined value signal, for providing a second result signal indicative of said detecting of said wave signal, said sensing circuit further comprising an OR-ing circuit, responsive to said result signal and to said second result signal, for providing an output signal, said sensing circuit further comprising a clocking circuitry for providing a first clocking signal to said correlated double sampling circuit, to said counter circuit and to said comparator, and for providing a second clocking signal to said second correlated double sampling circuit, to said second counter circuit and to said second comparator circuit, said first clock signal and said second clock signal being substantially in quadrature with respect to each other.

3. Sensing circuit according to claim 1, wherein said correlated double sampling circuit includes a first differential pair arrangement and a second differential pair arrangement which are connected with each other via respective cross connection links with respective connection points, each one of said first differential pair arrangement and said second differential pair arrangement having an input terminal coupled to a first transistor means thereof and an output terminal coupled to a second transistor means thereof and being coupled to a first power terminal and via an amplifier stage to a second power terminal, said sensing circuit additionally including for each said differential pair arrangement a respective capacitor means coupled between said respective connection points and said respective output terminal, each one of said differential pair arrangements being coupled to said respective capacitor means and to said respective amplifier stage via respective switching means controlled by a first control signal and a second control signal, so as to have said sensing circuit working as a voltage follower circuit during a first time interval, as a hold circuit during a subsequent second interval and as a latch during a subsequent third interval, thereby providing at said respective output terminals a bipolar return-to-zero signal being identical to an analog input signal applied to said respective input terminals during said first time interval, having a first constant value during said subsequent second time interval, said value being a sampling value of said input signal at an end of said first time interval and having a second constant value during said subsequent third interval said second constant value being an amplification of a difference between said first constant value and a value of said input signal at a start of said subsequent third time interval.

4. Sensing circuit according to claim 3, wherein said correlated double sampling circuit additionally comprises for each of said differential pair arrangements a respective charge injection compensation circuit coupled between a connection point of said respective capacitor means which is also coupled to said respective connection points and said respective amplifier stage.

5. Sensing circuit according to claim 1, wherein said predetermined count value equals a maximum count value, which would be provided in case of a perfect said wave signal, minus a predetermined deviation value.

6. Sensing circuit according to claim 1, wherein said wave signal is a sine wave signal.

* * * * *